United States Patent Office 3,235,181
Patented Feb. 15, 1966

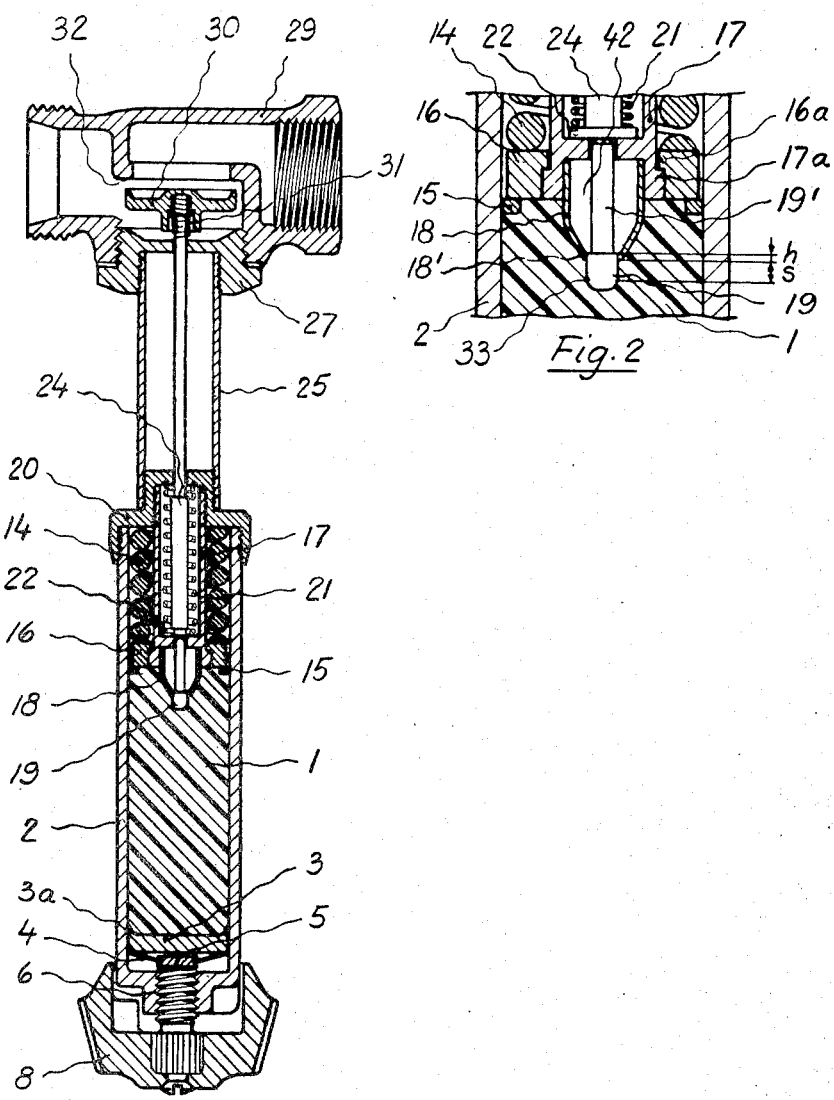

3,235,181
THERMOSTATICALLY CONTROLLED VALVE
Baltzar Carl von Platen, Stockholm, Sweden, assignor to AGA Aktiebolag, a corporation of Sweden
Original application May 3, 1960, Ser. No. 26,544, now Patent No. 3,121,331, dated Feb. 18, 1964. Divided and this application Feb. 12, 1964, Ser. No. 344,318
2 Claims. (Cl. 236—100)

This is a division of application Serial No. 26,544, filed May 3, 1960, now Patent No. 3,121,331.

The present invention relates to thermostats of the kind in which a thermally-responsive element, for example a liquid or soft rubber, is enclosed in a casing and is useful for many purposes such as for regulating the temperature in a room or in a refrigerator by acting upon a valve or electric switch in accordance with the volume changes of said responsive element.

Thermostats are known, in which the valve body is loaded by a spring, that acts to open the valve. The spring power is taken up by the thermally-responsive element enclosed in the casing. For this purpose the valve stem rests and is held against the thermally-responsive element by means of a piston or bellows. As long as the temperature of the said responsive element is above a predetermined degree for example, 20° C. of a room to be regulated, the thermally-responsive element has such a volume and such a pressure that the valve body is pressed against its seat and the valve is thus closed. If the temperature drops below that particular degree, the temperature decided upon, the power of the valve spring overcomes the power of the responsive element and the valve body is moved from its seat. That is to say, the valve is opened and heating medium, which can be heating water, is permitted to be supplied to the room until the temperature of the room has again reached the predetermined level. At that time the thermally-responsive element has also obtained that temperature and has expanded to such a degree that the valve body is again seated and the heat supply to the room is interrupted.

The thermally-responsive element can be considered as essentially incompressible. When the valve is closed by the desired temperature being reached, a further thermal volume increase of the responsive element cannot cause a position alteration of the piston or bellows connected with the valve body. Thus, by further increase of the temperature for any reason, the pressure in the enclosed responsive element will increase rapidly. In order to prevent this, that is to say, to limit the pressure rise, there is provided a second piston or bellows loaded by a spring and resting against the responsive element. The last-mentioned spring and piston or bellows will yield by volume rise of the responsive element over a certain volume, initial volume, and act as a safety arrangement. This spring is hereinafter referred to as the "safety spring" and the piston referred to as the "safety piston."

Thermostats of this kind must be adjustable for the setting of desired predetermined temperature which must be optional, such as for example 18°, 21°, 25° C. etc. Therefore, there is a third piston provided in the form of a push piston, engaging the thermally-responsive element. By changing the position of the last-mentioned piston the setting of the responsive element for the desired room temperature is obtained. It is possible to make the safety piston and the push piston as a single element.

The safety spring must be strong enough to hold the safety piston in its initial position when the valve is closed against the action of the heating medium pressure by the action of the responsive element on the valve piston. Accordingly, the safety spring in known thermostats must have sufficient and adjustable power because of variations in the pressure of the heating medium, and the safety spring must be proportioned for the highest present heating medium pressure. This requires a large size of spring and thermostat and therefore difficulty in mounting the thermostat is often encountered. Otherwise, the temperature setting would be dependent upon the pressure of the heating medium, preferably heating water, and if the heating water element connected to the thermostat is located on for example, the first or the fifth floor of a house, as the heating water pressure rises with the height of the house.

It is an object of the invention to provide a thermostat that functions independently of the pressure of the heating or cooling medium controlled by the valve acted upon by the thermostat. It is also an object of the invention to provide a new arrangement of the safety device for the thermostat.

With the foregoing in view, the principal feature of the present invention comprises a closed housing surrounding the outer sides of the valve piston and the safety piston and being in communication with the space for said heating or cooling medium.

Other features and advantages of the present invention will be apparent from the following detailed description thereof, when read in conjunction with the accompanying drawings forming a part of this specification wherein:

FIG. 1 shows an axial sectional view of a thermostat constructed in accordance with the invention and employed for controlling the temperature in a room by controlling the flow of a heating fluid such as hot water, in a room heating system;

FIG. 2 shows on an enlarged scale, an axial section through the central part of the embodiment shown in FIG. 1.

In FIG. 1 a soft rubber rod or cylindrical body is shown at 1. The rubber body or rod 1 is contained in a holder having a main part in the form of a cylindrical tube 2, conveniently made of aluminum as aluminum is one of those materials which reflect heat rays. A thin piston is shown at 3 and said piston is provided with an edge portion indicated at 3a. This piston 3 is in constant contact with a leaf spring 4 which is secured to a disc 5 that is in constant contact with a screw 6. Normally the parts 3 and 5 are also in contact with each other. A hand wheel 8 is fixed on the screw 6. The uppermost part of the tube 2 is elongated above the rubber 1 and it forms a cylindrical housing around the parts 15, 16, 17, 18 and 19. The part 15, shown clearly in FIG. 2 is in the form of a ring held by the pressure of the rubber 1 against another ring shown at 16. The ring 16 serves as a safety piston and is provided with a flange 16a which is pressed by a coil spring 14 constituting the safety spring, against a corresponding flange 17a of a tube 17. In the center hole of this tube 17 a conical body or funnel-shaped member 18 is fixed. The lower part of this element 18 is approximately frusto-conical. The upper end of the tube 17 is attached to a cover 20, which is threaded on or otherwise fixed to the cylinder 2. The upper end of the spring 14 rests against the cover 20. Another and a weaker spring 21 is disposed inside of the tube 17. The upper end of the spring 21 also rests against the cover 20 and its lower end rests on a flange 22 provided on a rod 24.

The part 19 is a piston fitting in the central hole of the funnel 18. The very small cylindrical part of this funnel, which is in contact with the piston 19 is shown at 18'. This small part 18' functions as an ordinary cylinder enclosing the piston and may therefore be called a cylinder in spite of the fact that this cylinder in this embodiment of the invention is considerably shorter than the piston. The cross section of the piston's cylindrical surface may be in the form of a circle, square, ellipse, etc., but naturally is preferably in the form of a circle.

The upper rod-like part 19' of the piston 19 may be made thinner than the head 19. It rests against the end of the rod 24 and is pressed thereagainst by the pressure of the rubber 1 on the piston 19. On the cover 20 is fixed a tube 25 of a poor heat conductor such as stainless steel. The upper end of the tube 20 is fixed to a cap 27 and this is attached to a valve housing 29. On the upper end of the rod 24 is attached a valve head 30 by means of a spring 31, so that the valve head can, when necessary tilt slightly to insure its proper seating against the valve seat shown at 32.

The shape of the funnel 18 is such that its concave side provides a cavity or space 42. This space, as well as the spaces surrounding the springs 14 and 21, and also the space inside of the tube 25, are filled with a grease, and preferably a grease which does not affect the rubber. Some silicone greases for example, have such properties. The grease prevents contact between the rubber and water. The spaces mentioned communicate with each other and as the rod 24 passes through the wall of the valve housing without any packing, there is communication between the interior of the valve housing and the interior of the tube 25 and therefore the pressure in the above-mentioned spaces is the same as that in the valve housing, that is, the pressure of the heating water is uniform in the several spaces. In this manner, the pressure of the heating water acts on the outer sides of the safety piston 16 and on the valve piston 19 and the inside of the funnel 18. Thus, the setting of the working level of the thermostat by means of the setting screw 6 is independent of the pressure of the heating water, even when the safety spring 14 has its theoretical minimum power or near to it. It is therefore inconsequential whether the thermostat is located on the first or the fifth floor of a house. The opening and closing of the valve and the adjacent heating radiator occurs independently of the pressure of the heating system and takes place exactly according to the determined temperature set by means of the setting means 3–8.

The minimum pressure in the rubber 1 is determined by the spring 4, the maximum pressure by the spring 14 and the normal pressure by the spring 21. The minimum pressure must be higher than the pressure of the water in the heating system. Thus, the water is prevented from leaking out. The tube 25 may also contain a tube or glass or a glass lining or other poor heat-conducting material. As a result when such an arrangement is used the amount of the relatively expensive silicone grease needed will be reduced. Between the silicone grease and the hot water a thin membrane or film of for example polytetrafluorethylene may be arranged when necessary.

The thermostat is set to different temperatures by reducing or increasing the volume of the rubber container, such as by turning the hand-wheel 8 and consequently moving the thin piston 3.

When the temperature increases, such as for example on a hot summer day, the pressure of the rubber would increase too much and to an extent undesirable if the volume were constant. However, for limiting the maximum pressure, an arrangement has been made by means of the two rings 15 and 16 and the spring 14. The two rings may be considered as one, because the first only serves to facilitate the assembling of the thermostat. When the pressure increases over a certain value, before which the valve 30 is closed, the rings 15 and 16 will move upwardly, thus compressing the spring 14. On the other hand, on a cold day, when the thermostat is set for room temperature, the pressure in the rubber will diminish if the house gets cold. However, in this case the spring 4 begins to function. It keeps the pressure above or at a certain minimum value, which as mentioned, is higher than the pressure of the water in the heating system, thus preventing the water from leaking out.

It is to be understood that the invention is not limited to the described embodiment. Changes may be made in details of construction, arrangement and proportions of the parts etc. without departing from the spirit of the invention. The explanation that the piston 19 is connected to a valve shall comprehend said piston being connected directly to a switch that is electrically connected to a valve for the regulation of the heating or cooling medium.

What I claim is:

1. A thermostat comprising a tubular, rigid body substantially sealed at one end, a volumetrically expansible, thermally-responsive body confined and sealed within said rigid body and engaged at one end with the substantially sealed end thereof and expandable away from said sealed end when subjected to temperature increases, a compression spring disposed axially within said rigid body and engaged between the other end of said rigid body and said thermally-responsive body for absorbing excessive compressive forces caused by expansion of said thermally-responsive body, said rigid body including a tubular extension projecting away from said other end of said rigid body, a force transmitting rod extending axially through said tubular extension and including a terminal valve element exteriorly of said tubular extension, a fluid coupling secured to said tubular extension for receiving a heating-and-cooling medium therethrough and having an intermediate valve seat engageable by said valve element whereby fluid flow is controlled in said coupling, said fluid coupling communicating with the interior of said tubular extension, a tube disposed axially within said compression spring in said rigid body above said expansible body and engaged therewith, said force transmitting rod abuttingly engageable with said tube, a second compression spring disposed axially within said tube about said rod and abuttingly engaged between said rigid body and said rod for normally urging said rod toward said expansible body, a force-transmitting pin extending axially between said force transmitting rod and said expansible body for transmitting force of expansion of said expansible body to said rod, a tubular body circumposed about said pin and having an apertured end through which said pin is exposed to said expansible body and which apertured end is engaged with the expansible body, and a combined lubricating-and-sealing medium filling said rigid body above said expansible body and disposed within said tube for preventing contact of said heating and cooling medium with said expansible body as well as eliminating the necessity for mechanical seals in said thermostat.

2. The structure as claimed in claim 1 in which said substantially sealed end of said rigid body includes means normally applying a biasing pressure at the one end of said expansible body, and manually adjustable force transmitting means on said one end of said rigid body for adjusting the biasing pressure on said expansible body.

References Cited by the Examiner

UNITED STATES PATENTS

| 2,208,149 | 7/1940 | Vernet. | |
| 2,410,795 | 11/1946 | Dillman | 236—92 X |
| 2,532,896 | 12/1950 | Dillman | 236—99 |
| 2,548,941 | 4/1951 | Brown | 236—48 X |
| 2,941,404 | 6/1960 | Woods | 73—368.3 |

FOREIGN PATENTS

| 10,254 | 11/1932 | Australia. |
| 471,960 | 9/1937 | Great Britain. |

WILLIAM F. O'DEA, *Acting Primary Examiner.*

ALDEN D. STEWART, EDWARD J. MICHAEL,
*Examiners.*